United States Patent
Megel et al.

(10) Patent No.: US 10,411,274 B2
(45) Date of Patent: Sep. 10, 2019

(54) ARRANGEMENT OF ELECTROCHEMICAL CELLS AND THE USE OF THE SAME

(71) Applicant: FRAUNHOFER-GESELLSCHAFT ZUR FOERDERUNG DER ANGEWANDTEN FORSCHUNG E.V., Munich (DE)

(72) Inventors: Stefan Megel, Dresden (DE); Lutz Schadt, Dresden (DE); Mihails Kusnezoff, Dresden (DE); Jochen Schilm, Radebeul (DE); Nikolai Trofimenko, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 38 days.

(21) Appl. No.: 15/563,153

(22) PCT Filed: Mar. 23, 2016

(86) PCT No.: PCT/EP2016/056360
§ 371 (c)(1),
(2) Date: Sep. 29, 2017

(87) PCT Pub. No.: WO2016/156145
PCT Pub. Date: Oct. 6, 2016

(65) Prior Publication Data
US 2018/0083297 A1    Mar. 22, 2018

(30) Foreign Application Priority Data

Mar. 30, 2015  (DE) .................. 10 2015 205 728
Apr. 1, 2015   (DE) .................. 10 2015 205 944

(51) Int. Cl.
*H01M 8/0297*  (2016.01)
*H01M 8/0282*  (2016.01)
*H01M 8/0258*  (2016.01)
*H01M 8/2425*  (2016.01)
*C25B 1/08*    (2006.01)
*C25B 9/20*    (2006.01)
(Continued)

(52) U.S. Cl.
CPC ............ *H01M 8/0297* (2013.01); *C25B 1/08* (2013.01); *C25B 9/00* (2013.01); *C25B 9/20* (2013.01);
(Continued)

(58) Field of Classification Search
CPC combination set(s) only.
See application file for complete search history.

(56) References Cited

U.S. PATENT DOCUMENTS 6,656,625 B1 * 12/2003  Thompson .............. B32B 18/00
                                                          429/465
7,026,067 B2    4/2006  Ringel
(Continued)

FOREIGN PATENT DOCUMENTS

DE  10039024 A1  2/2002
DE  10330476 A1  2/2005
(Continued)

*Primary Examiner* — Kaity V Chandler
(74) *Attorney, Agent, or Firm* — Jacobson Holman, PLLC.

(57) ABSTRACT

The invention relates to an arrangement of electrochemical cells and also to the uses thereof. The electrochemical cells are arranged one above another and are in electrically conducting communication with one another. In this arrangement they form repeating units which in each case are formed of at least one interconnector, in which apertures for gas passage are formed, an electrochemical cell, which is formed of a cathode, an electrolyte and an anode, and contact elements on the anode side and on the cathode side, and are arranged one above another. The area of the individual planar electrochemical cells is in each case smaller than the area of the individual interconnectors, and the electrolytes finish flush in each case with a plane of a surface of the respective interconnector. Mounted on this surface of
(Continued)

the interconnector in each case is a single sealing ply of a glass solder with constant thickness, for sealing the gap between electrolyte and interconnector (internal joining) and the gaps between apertures for gas passage of two adjacent interconnectors (external joining).

8 Claims, 6 Drawing Sheets

(51) Int. Cl.
  *H01M 8/0276* (2016.01)
  *C25B 9/00* (2006.01)
  *H01M 8/0247* (2016.01)
  *H01M 8/124* (2016.01)

(52) U.S. Cl.
  CPC ....... *H01M 8/0258* (2013.01); *H01M 8/0276* (2013.01); *H01M 8/0282* (2013.01); *H01M 8/2425* (2013.01); *H01M 8/0247* (2013.01); *H01M 2008/1293* (2013.01); *Y02E 60/366* (2013.01)

(56) References Cited

U.S. PATENT DOCUMENTS

| | | |
|---|---|---|
| 8,071,252 B2 | 12/2011 | Ringel |
| 8,153,327 B2 | 4/2012 | Ringel |
| 8,383,282 B2 | 2/2013 | Reinert |
| 2003/0165729 A1* | 9/2003 | Ringel ................ H01M 8/2425 429/416 |
| 2003/0235746 A1 | 12/2003 | Haltiner |
| 2009/0325023 A1 | 12/2009 | Kusnezoff |
| 2012/0094201 A1* | 4/2012 | Haltiner, Jr. ........ H01M 8/2425 429/443 |
| 2013/0072137 A1 | 3/2013 | Carney et al. |
| 2013/0292038 A1* | 11/2013 | Li ........................ C03C 27/06 156/109 |
| 2015/0004463 A1* | 1/2015 | Borck ................ H01M 2/1613 429/136 |
| 2015/0086898 A1* | 3/2015 | Haltiner, Jr. ........ H01M 8/0247 429/463 |

FOREIGN PATENT DOCUMENTS

| | | |
|---|---|---|
| DE | 10350478 A1 | 4/2005 |
| DE | 10 2005 014077 A1 | 5/2006 |
| DE | 102005005116 A1 | 8/2006 |
| DE | 102005005117 A1 | 8/2006 |
| DE | 102013007703 A1 | 11/2014 |
| DK | 1665431 T3 | 1/2016 |
| EP | 2132814 B1 | 12/2009 |
| JP | 06-15262 | 2/1994 |
| JP | 10-312818 | 11/1998 |
| JP | 2008-535149 | 8/2008 |
| WO | WO0213299 A2 | 2/2002 |
| WO | WO2006099830 A1 | 9/2006 |
| WO | WO2008022638 A2 | 2/2008 |

* cited by examiner

ARRANGEMENT OF ELECTROCHEMICAL CELLS AND THE USE OF THE SAME

The invention relates to an arrangement of electrochemical cells and also to the use thereof, and particularly to the joining elements and contact elements of electrochemical cells which can be produced cost-effectively and in an automatizable way as a planar cell stack for use in electrolysis and/or with fuel cells, especially solid oxide fuel cells (SOFCs) or solid oxide electrolysis cells (SOECs). The invention further pertains to efficient use of a sheet made of a glass which for the assembling of adjacent repetition units such electrochemical cells and realization of the contacting between electrodes and a metallic bipolar plate of the electrochemical cells in the joining operation. The invention further relates to an SOFC stack for producing electric current and heat, and also to SOEC stacks for highly efficient generation of hydrogen and/or synthesis gas.

Planar cell stacks for use in energy conversion and hydrogen production are known from the prior art. In general, a plurality of planar cells are brought together to form a cell stack, in which the individual repetition units, consisting of the cathode-electrolyte-anode assembly (known as "cell"), bipolar plate (known as "interconnector"), joining elements and contact elements, follow one another along a stack direction. Electrical contacting between individual repetition units is accomplished by means of a heat treatment (known as the joining procedure). This electrical connection of the individual cells via the interconnector arrangements places the cells electrically in series, allowing cell stacks to be scaled up to the required power.

A repetition unit is defined here as a stack element which is assembled at room temperature from individual components (cell, interconnector, joining elements and contact elements) and which is used in the subsequent step for stack construction. In the context of a fuel cell application, the air side of a cell is typically referred to as the cathode side (where oxygen reduction takes place), and the combustion gas side is referred to as the anode side (where hydrogen oxidation takes place). In the context of electrolyzer application, the air side becomes the anode side (where oxidation of oxygen takes place) and the combustion gas side becomes the cathode side (where reduction of hydrogen takes place from the water vapor).

The prior art discloses a number of variants for the construction of such repetition units for application as a fuel cell (US 2003/0235746 A1, DE 103 30 476 B4, DE 103 50 478 B4, EP 2 132 814 B1, WO 2008/022638 A1). In these variants, the fusional, gas-tight connection of the cell to the interconnector (known as internal joining) and the sealing of the combustion gas spaces and, where appropriate, air spaces (manifolds) on connection of the individual repetition units (external joining) are considered separately in these descriptions and also in the relevant literature.

Analysis of the aforementioned specifications shows US 2003/0235746 A1 as describing essentially the integration of the cell with multi-ply interconnector (internal joining). An interconnector here consists of four metallic frames. The respective cell is connected to a frame by means of glass solder. This construction is then provided with cathode and anode contact elements (in the form of struts) and is thereby made up to form the repetition unit. The gas spaces of the repetition units are sealed off by further glass solder plies (external joining). In this construction, therefore, two glass solder plies, differing in thickness and in different stack planes, are needed, a fact which makes it more difficult to carry out cost-effective production of such repetition units.

DE 103 30 476 B4, especially FIG. 2, describes a repetition unit construction in which at least two glass solder parts differing in thickness must be applied to one side of the repetition unit. This requires the use of glass solder sheets with different thicknesses, and involves at least two application steps.

DE 103 50 478 B4 describes a construction in which a cell is sintered onto a metallic housing (internal joining by sintering of the cell to the interconnector). Thereafter, the contact elements and joining elements are applied to the part produced, so as to form the repetition units. A substantial disadvantage of this solution lies in an additional heat treatment step for the sintering of the cell onto the metal housing.

EP 2 132 814 B1 describes a method for efficient contacting of the cell with the interconnector (internal joining), the internal joining requiring that the glass solder parts be placed onto only one side of the interconnector. No external joining is described in this case. Single-sided application of the glass solder parts is a problem, particularly in the case of thick joining elements (thickness >0.4 mm), and requires multiple, successive coating or multiple, successive laminating of the glass solder sheets, resulting in additional costs.

WO 2008/022638 A1 describes essentially the integration of the cell with a multi-ply interconnector, in which case internal joining and external joining can be realized simultaneously, since the electrolyte size and shape is the same as the size of the metal frames. The scalability of the external dimensions of this construction is limited by the difference in the thermal expansion of the electrolyte material and of the metallic interconnector. Generally speaking, the cell size (cell size is dictated by the external dimensions of the cell) is smaller than the size of the metallic interconnector.

On the basis of this prior art, there continues to be a need to optimize the construction of the repetition units, in which the respective size of the area of a planar cell is smaller than the area of the interconnector. This relates in particular to the number of joining parts used and to the number of steps required for the application and connection of said parts. It is ideal for this purpose if glass solder parts of uniform thickness can be used for the external and internal joining, irrespective of the ultimate thickness of the repetition units. An advantage here is that these parts can be applied symmetrically to both interconnector areas (uniform application technology).

It is therefore an object of the invention to simplify the production, especially the assembly and the joining, of arrangements of electrochemical cells and to durably achieve a high level of tightness relative to the surrounding atmosphere.

In accordance with the invention, this object is achieved with an arrangement having the features of the independent and dependent claims herein.

The inventive arrangement of electrochemical cells which are arranged one above another and are in electrically conducting communication with one another is formed using repetition units. The repetition units consist of at least one interconnector, an electrochemical cell, which is formed in turn in each case of a cathode, an electrolyte and an anode. Apertures for gas passage are formed in the interconnectors. Further elements of a repetition unit are contact elements on the anode side and cathode side.

The electrolytes each finish flush with a plane of a surface of the respective interconnector. A single sealing ply of a glass solder with constant thickness is mounted on this surface of the interconnector in each case. With this single sealing ply it is possible to seal the gap between electrolyte and the interconnector, referred to as internal joining, and to seal the gaps between apertures for gas passage of two adjacent interconnectors, known as external joining.

In the case of the invention, therefore, external joining and internal joining are achievable with only one single sealing ply of a glass solder with constant thickness, which is formed on a surface of a respective interconnector.

The arrangement may be closed off with a top plate at one end side and with a baseplate on the opposite end side.

Furthermore, the outer edges of the individual electrolytes of the electrochemical cells may finish flush with edges of a cathode recess which is formed in a surface of the interconnector.

On the surface to be sealed, regions in which channels for passage of gas, in particular for the supplying of oxidant (e.g. air) and fuel (e.g. hydrogen) and removal of off-gas are formed, and the region in which a contact element of one of the electrodes of the electrochemical cell is arranged, ought to be kept free from glass solder.

The invention is described hereinafter using the example of the construction of a cell stack for electrochemical application as a fuel cell (cathode side=air side, anode side=combustion gas side). The cell stack can also be used for electrolysis, in which case the air side becomes the anode side and the combustion gas side becomes the cathode side.

Figure 1:
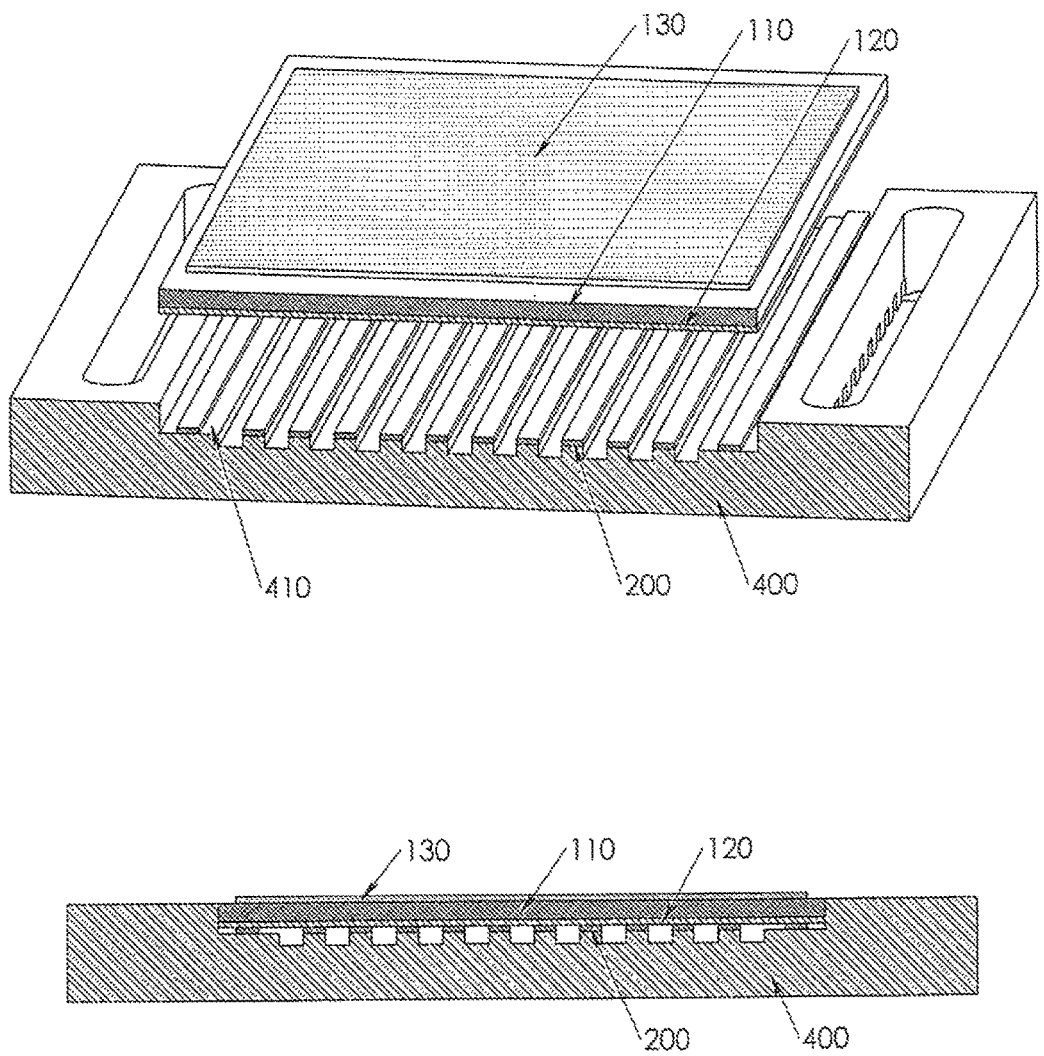
FIGS. 1 and 2 show, in perspective view and in a sectional view, the basic construction of a repetition unit.
Figure 2:
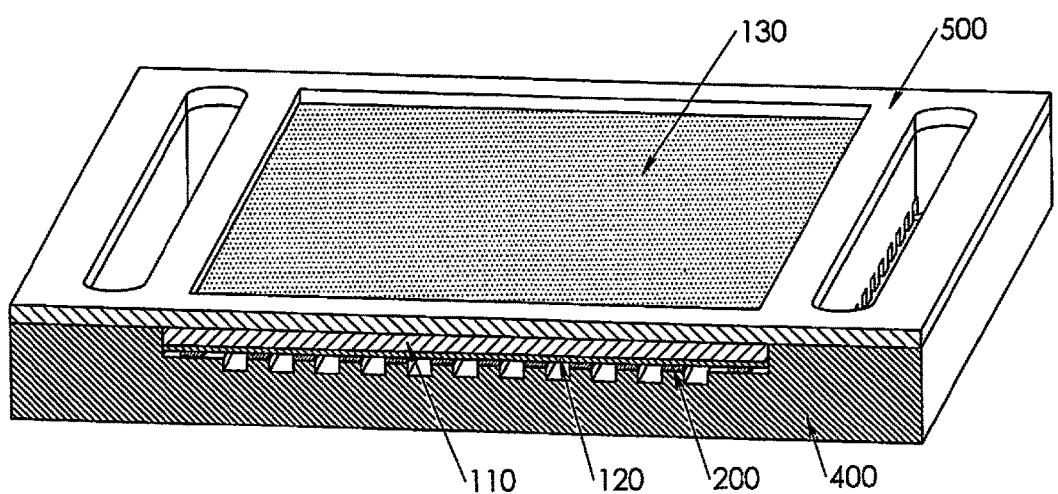

FIGS. 1 and 2 show the construction of repetition units of the kind which are known and can be used in the context of the invention. There is an interconnector 400, which has a greater areal extent than a unit which is formed with a cathode 120 and an anode 130, between which a suitable electrolyte 110 is arranged. Formed in the region of the cathode-electrolyte-anode assembly (CEA) in the interconnector 400 is a cathode recess 410, into which the CEA can be inserted, so that at least the electrolyte 110 rests with its outer lateral end sides on the interconnector material. In the region of the cathode recess 410, elevations and indentations form gas channels through which oxidant is able to reach the cathode 120.

In the perspective views of FIGS. 1 and 2, in addition to the cathode recess 410, there are unlabeled cutouts shown which form channels and via which there may be supply of oxidant (more particularly air) or fuel and/or removal of off-gas.

FIG. 2 is intended, moreover, to show how a sealing ply 500 is formed on the surface of the interconnector 400 and is connected to said surface. The sealing ply 500 in this case has cutouts which allow access to the anode 130 and to the channels for oxidant, fuel and off-gas, respectively.

Figure 4:
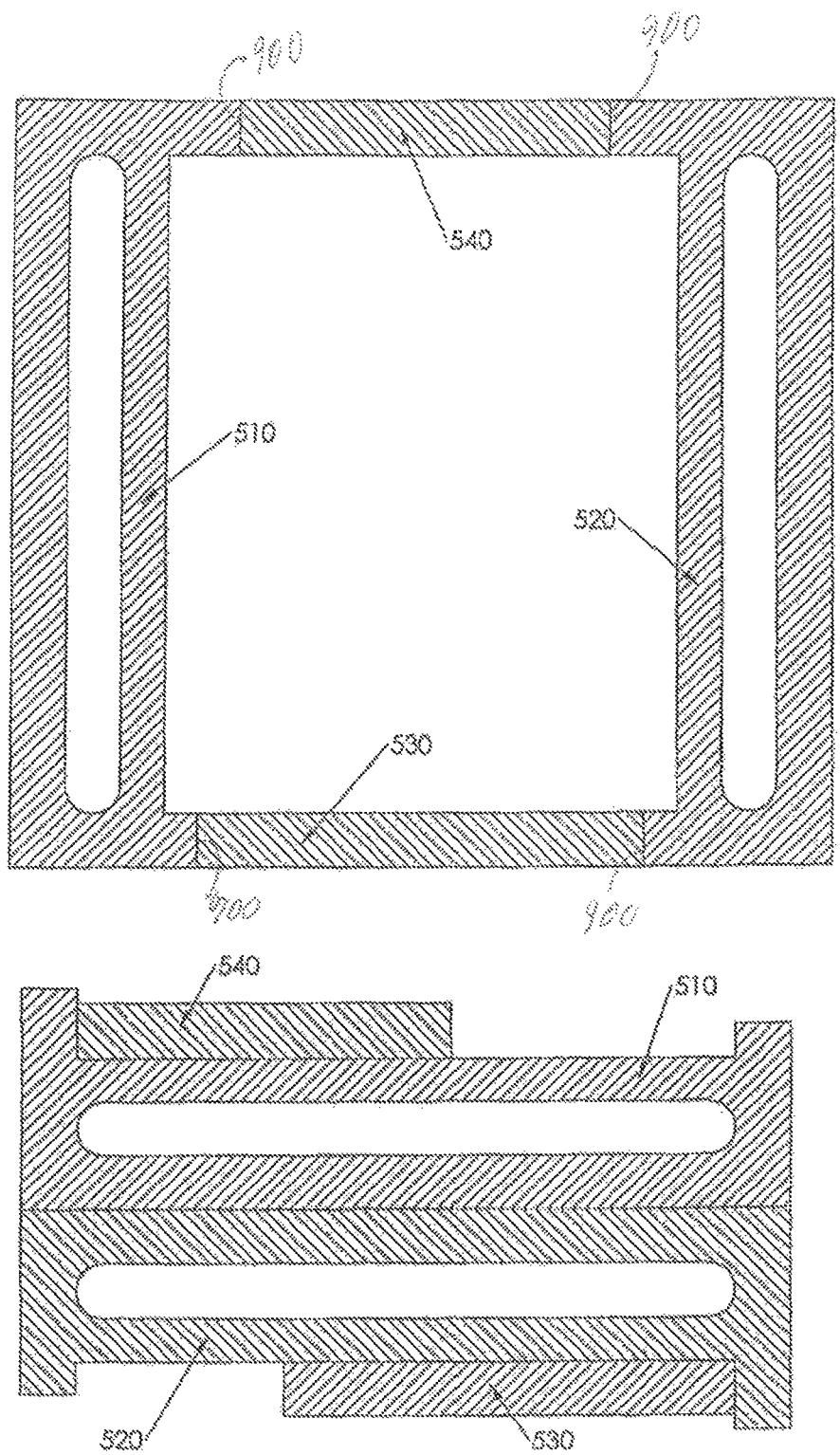
FIG. 4 shows possible embodiments and arrangements of glass solder sheet elements in a plane on a surface of a repetition unit.

With FIG. 4 it becomes clear that the sealing ply to be fusionally connected on the two opposing surfaces of an interconnector 4 can be formed with a plurality of glass solder sheet elements 510, 520, 530 and 540. These glass solder sheet elements 510, 520, 530 and 540 abut one another by end faces and so form an uninterrupted sealing ply 500 around the anode 130 and the channels.

Possible geometric forms and arrangements of glass solder sheet elements 510, 520, 530 and 540 are shown in FIG. 4.

Figure 5:
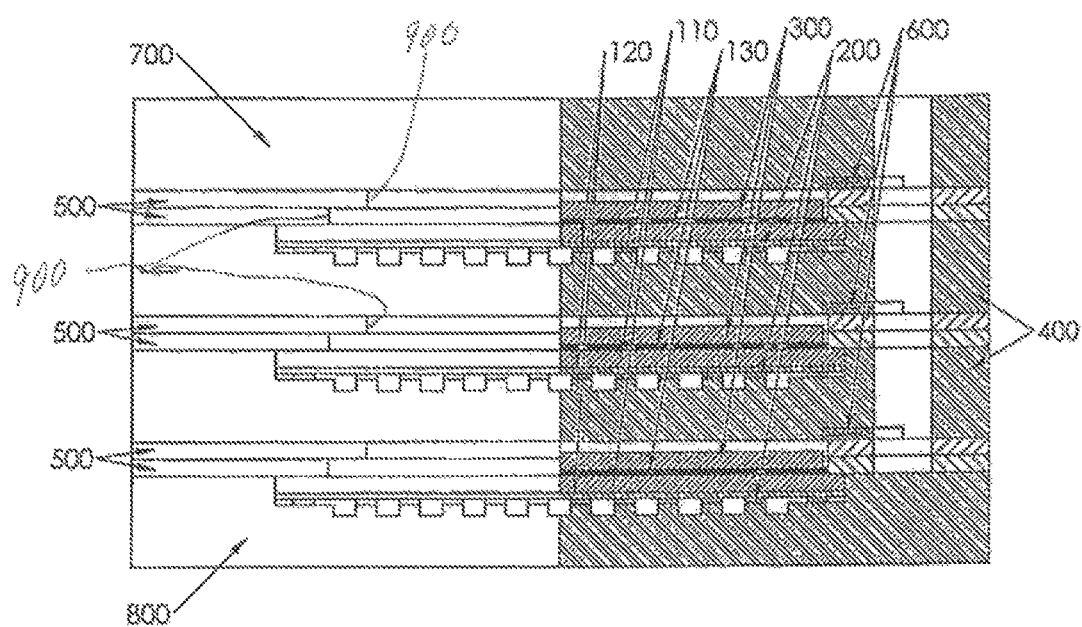
FIG. 5 shows a sectional view through one example of an inventive arrangement.

An example of an inventive arrangement is shown in the partial sectional view in FIG. 5. In this case, three repetition units are encased by a top plate 700 on one end side and by a baseplate 800 on the oppositely arranged end side, and it is possible accordingly there to achieve a fluid-tight closure with top plate 700 and baseplate 800. Both plates 700 and 800 may consist of an electrically conductive material.

It becomes clear, moreover, that the sealing between repetition units can be achieved with in each case by one sealing ply 500, which is fusionally connected to a surface of an interconnector 400 of a directly adjacent repetition unit to a surface of an interconnector 400 of a repetition unit with a sealing ply 500.

Figure 6:
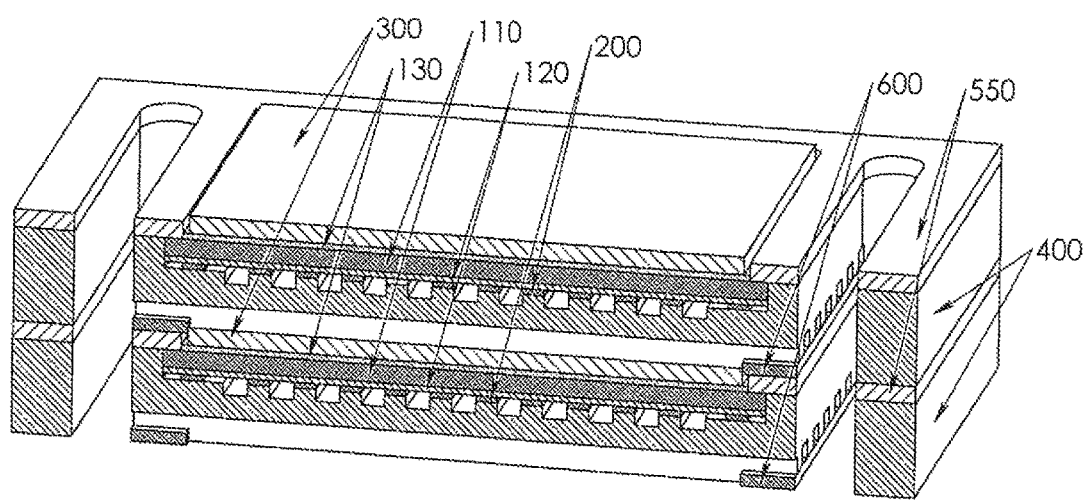
FIG. 6 shows a perspective sectional view of one example of an inventive arrangement.

From FIGS. 5 and 6 it is also becomes clear that the size of the areas of the electrochemical cells, in other words the CEAs, is smaller than the area the area of interconnectors 400.

FIG. 6 shows a completed arrangement produced after a heat treatment, with a sintered sealing ply 550 between the adjacent repetition units in each case, these being fusionally connected to the respective surfaces of the respective interconnectors 400. It is also possible to recognize cathode-side contact elements 200 and anode-side contact elements 300, with which an electrical current flow by gas supply structure is achieved, in which oxidant and fuel can reach the electrodes 120 and 130, from the electrodes 120 and 130 to the respective interconnector 400.

A uniform overall thickness of the glass solder sheet elements 510 to 540 can be utilized only when two flat planar areas are to be connected to one another. The solution on which the invention is based also involves the connection of an electrochemical cell 100 to an interconnector 400 taking place in such a way that a surface of the electrolyte 110 of a cell 100 forms a flush planar plane with one of the interconnector surfaces (see example in FIG. 1). For this purpose, the respective cathode contact element 300, cathode 130 and electrolyte 110 may be accommodated in a cathode-side cutout 410 of the respective interconnector 400. The oppositely arranged surface of the interconnector 400 has no cutout, and glass solder sheet elements 510 to 540 are required merely to bridge the anode-side contact element 300 and the thickness of the anode 120 (in this case <50 μm). In the case of thin anode-side contact elements 200 (<100 μm), screen printing or mask printing, for example, may be utilized for the application of the glass solder in uniform thickness to the opposing surface of the interconnector 400, for joining.

In the application of the glass solder sheet to elements, it is present practice to use auxiliary agents in order to adhere the completed glass solder sheet parts manually to a surface of the interconnector or surfaces of the electrochemical cell. In this operation, geometrically precise placement is difficult and can usually be achieved only with auxiliary agents or with very rigid glass solder sheets of appropriate thickness, which are very time-consuming. In the context of the invention, the application of the glass solder sheet elements 510 to 540 may be taken on by a semiautomatic machine, in which the punching operation and application can be carried out in succession. As a result of the punching of the glass solder sheet elements 510 to 540 and the fixing on the die of a punch, the glass solder sheet elements 510 to 540 have a very high degree of accuracy in shape and position. Because the operation of application can be by a programmed robot gripper, which may be connected directly to the part of the semiautomatic or, preferably, automatically operating machine which is utilized for punching, there is no need for positioning or magazining of the glass solder sheet elements 510 to 540. Consequently, the glass solder sheet elements 510 to 540 can be positioned with micrometer accuracy. This makes it possible to avoid all of the disadvantages entailed by additional handling of punched glass solder sheets.

In general, the anode-side contact element 300 has a thickness of 0.3 mm to 0.5 mm. In one selected example, the thickness of the anode-side contact element 200 ultimately defines the overall thickness of an electrochemical cell 100 after joining. The elements to be joined to one another have an overall thickness of about 0.6 to 1.0 mm in the unsintered (or "green") state, taking account of approximately 50% contraction prior to sintering. Within this thickness range it is useful to use glass solder sheet for joining. In principle it is technically possible to produce the glass solder sheet elements 510 to 540 in this order of thickness magnitude by means of tape casting. However, it is almost impossible to achieve the permissible thickness tolerances of about +/−10 μm in the dried state. For this reason, it is more cost-effective to produce the glass solder sheet elements 510 to 540 with a thickness of 0.25 mm to max. 0.45 mm by tape casting and to laminate them to one another. In the case of single-sided application, that would require two to four laminating steps connecting the individual glass solder sheets to one another. To avoid this effort and complexity, glass solder sheet elements 510 to 540 can be placed symmetrically onto opposing surfaces of the interconnector 400 (cf. FIG. 2 and FIG. 3). Here it is possible to use glass solder sheet elements 510 to 540 with mutually deviating (or "complementary") thickness tolerances, of the kind occurring in the process of tape casting of different batches, and so to reduce considerably the reject rate in glass solder sheet production. Furthermore, the glass solder sheets can be composed of simple constituents and hence it is possible to reduce reject rates during punching of the parts to be joined.

Figure 3:
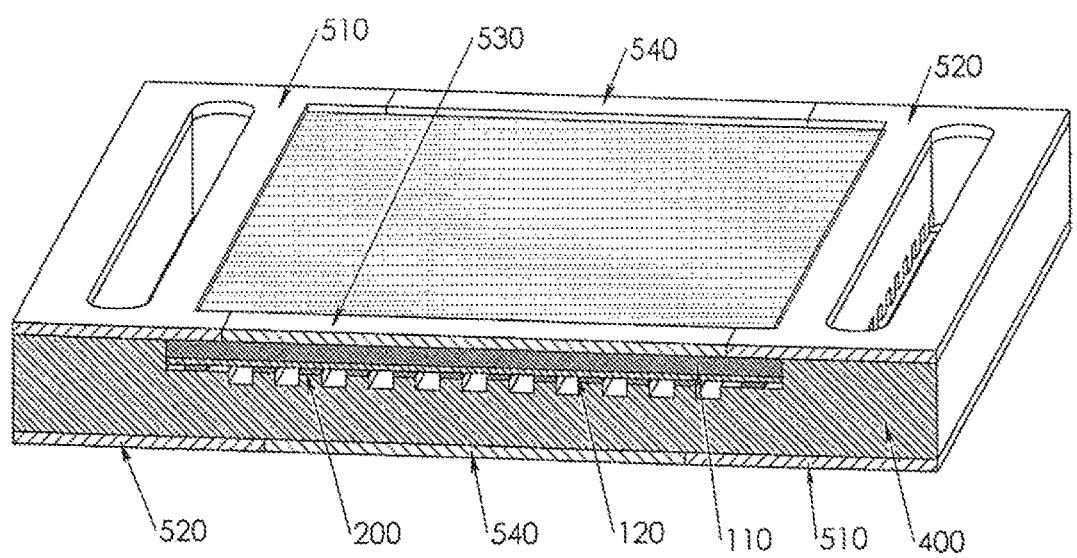
FIG. 3 shows, in a perspective view and in a sectional view, the basic construction of a repetition unit with glass solder sheet elements in the green state, on two oppositely arranged surfaces of a repetition unit, with which sealing plies are formed.
Figure 3:
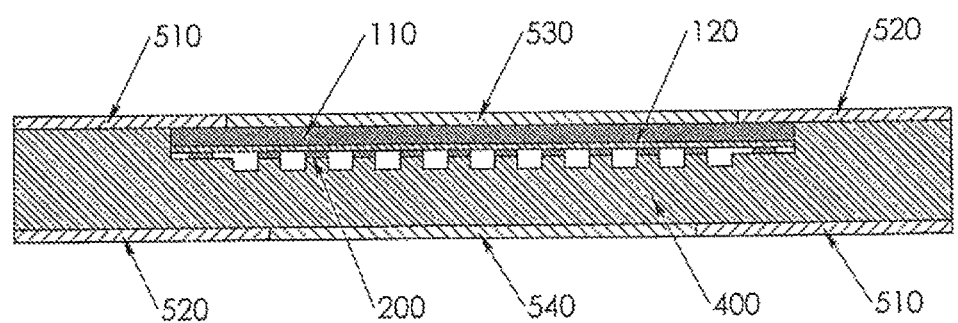

FIG. 4 shows the geometry and thickness of the glass solder sheet elements 510, 520, 530 and 540 which can be used for a sealing ply 500 when the thickness of the anode-side contacting is to be 350 μm and the anode thickness is to be 50 μm. The glass solder sheet elements 510, 520, 530 and 540 are punched from green glass sheet with a thickness of 350+/−20 μm and in the subsequent step are placed automatically on a surface of a preassembled repetition unit (FIG. 3). The glass solder sheet elements 510, 520, 530 and 540 are measured beforehand and pre-sorted into thickness classes, thus producing a sum thickness of 700+/−20 μm for the glass solder sheet elements arranged one above another in a common joining plane on the two opposing sides.

With the solution presented, the situation arises that joins may occur between individual glass solder sheet elements 510, 520, 530 and 540, and these joins 900 can be closed in the subsequent joining operation by means of viscous flow of the glass solder. Here it would be advantageous to rotate the interconnector 400 by 180° before placing the same glass solder sheet elements 510, 520, 530 and 540 on the other side of the preassembled repetition unit. As a result, the joins of the glass solder sheet elements on the opposing surfaces of the interconnector 400 are not arranged one above another (FIG. 5) and so can be closed more easily during the joining operation.

The semiautomatic or automatic application of the glass solder sheet elements 510, 520, 530 and 540 to a surface of an interconnector 400 allows coating with glass solder sheets having different properties (including very soft sheets) to take place efficiently and with high quality. In the ongoing operation, the respective electrochemical cell 100 is applied by its anode contacting 200 to the oppositely arranged surface of the interconnector 400. The second layer of glass solder sheet elements 510 to 540 is applied, with a rotational offset of 180°, to this assembly, by means of a semiautomatic or automatic glass solder sheet application machine. Manual application of glass solder sheets to this assembly may advantageously take place, for technical reasons and reasons of time, in semiautomatic or fully automatic fashion. Fully automatic application of glass solder sheets is possible with these operations, by utilizing cassettes for interconnector 400 and glass solder sheet elements 510 to 540.

The repetition units are stacked one above another and provided with top plate 700 and baseplate 800 (FIG. 5). The cell stack is subsequently joined imperviously and fusionally by a heat treatment, utilizing the glass solder. In the course of this operation, contacting is effected between anode 120 of the cell 100 and the anode contact element 200, as is the serial connection of the cells 100 to one another, as shown in FIG. 6. Following an electrochemical initialization procedure, the cell stack, formed with a plurality of repetition units arranged one above another, is ready for use as a fuel cell or electrolyzer.

LIST OF REFERENCE NUMERALS

100 electrochemical cell
110 electrolyte
120 cathode
130 anode
200 cathode/air side contact element
300 anode/gas side contact element
400 interconnector with/without protective layer
410 cathode recess
500 sealing ply of glass solder in the green state
510 glass solder sheet element
520 glass solder sheet element
530 glass solder sheet element
540 glass solder sheet element
550 sealing ply in the assembled state
600 small insert plate
700 top plate
800 baseplate
900 joins

We claim:

1. An arrangement of electrochemical cells which are arranged one above another and in electrically conducting communication with one another, wherein said arrangement comprises a plurality of repeating units stacked upon each other, each repeating unit comprising at least one interconnector having opposing planar surfaces, said interconnector having apertures for gas passage, a planar electrochemical cell within said interconnector formed of a planar cathode, a planar anode, and an electrolyte between said cathode and anode, and further comprising cathode and anode contact elements, and wherein the planar area of each electrochemical cell is smaller than the planar area of said interconnector, and wherein the electrolyte is flush with one of said planar surfaces of the interconnector, wherein each repeating unit further comprises a single planar sealing ply comprising a glass solder having constant thickness mounted upon each of said opposing planar surfaces of the interconnector for sealing any gaps between said electrolyte and the interconnector and sealing any gaps between said apertures for gas passage between two adjacent stacked interconnectors, wherein said sealing ply is formed from plural glass solder sheet elements that are joined with each other at joins, wherein one sealing ply is mounted on one surface of said interconnector and another sealing ply is mounted on the opposing surface of the interconnector such that the joins of the sealing ply mounted on said one surface and the joins of the sealing ply mounted on said opposing surface are offset from each other in a direction perpendicular to the planes of the sealing plies.

2. The arrangement as claimed in claim 1, wherein said arrangement is closed off with a top plate at one end side and with a baseplate on an opposite end side.

3. The arrangement as claimed in claim 1, wherein said electrochemical cell is arranged inside of a recess which is formed in said interconnector.

4. The arrangement as claimed in claim 1, wherein each said sealing ply has a maximum thickness deviation of 20%.

5. The arrangement as claimed in claim 1, wherein said sealing plies on opposing surfaces of the interconnector have different thicknesses, the thickness of each individual sealing ply being constant.

6. The arrangement as claimed in claim 1, wherein each sealing ply on opposing surfaces of said interconnector is arranged rotated by 180° from one another.

7. The arrangement as claimed in claim 1, wherein said glass solder sheet elements are formed by robots for a fully automatic assembly.

8. The use of an arrangement as claimed in claim 1 as a fuel cell and/or electrolyzer.

* * * * *